Patented Nov. 2, 1937

2,097,638

UNITED STATES PATENT OFFICE 2,097,638

AZO COMPOUNDS AND THEIR PRODUCTION

James P. Penny, Buffalo, N. Y., assignor to National Aniline & Chemical Company, Inc., New York, N. Y., a corporation of New York No Drawing. Application March 13, 1933, Serial No. 660,465

10 Claims. (Cl. 260—92)

This invention relates to new azo dyestuffs soluble in organic solvents and to processes for their manufacture.

Dyestuffs which may be used in solution in organic solvents to color materials of various kinds can be prepared by causing an N-monoarylated, or an N-monoaralkylated, derivative of a monoamino-monohydroxy-naphthalene monosulfonic acid which is free from an acid salt-forming group in the aryl nucleus to couple with the diazo compound of an arylamine of the benzene or naphthalene series, or the diazo compound of an aminoazo body of the benzene series, said diazo compounds also being free from an acid salt-forming group. I have discovered that these dyestuffs are soluble in organic solvents, more particularly organic liquids which contain oxygen in their composition, and especially those which are aliphatic compounds. Thus compositions containing an alcohol, ester, ether, ketone and the like may be colored by these dyestuffs. For example, solutions of one or more of these dyestuffs in one or more organic solvents may be used to color resinous compositions, both of the natural and synthetic types, and cellulose derivatives (esters, ethers, nitrates, etc.); as for example, cresol resins, pyroxylin and other lacquers, shellac, Celluloid, cello-glass, leather finishes, compositions for air brush work, etc. I have found, furthermore that these dyes in solution in organic solvents, especially alcohols, are particularly suitable for use as wood stains, since, when used alone or in combination, they permit the production of a variety of stains which possess good fastness to light.

According to the present invention new dyestuffs which are of particular value for such uses can be obtained by coupling N-aryl or N-aralkyl-I-acids, particularly the former, with diazotized xylidines or aminoazo-xylenes, and especially those which are derived from o-xylidines or mixtures of xylidines containing a major proportion of o-xylidines. I have found that the dyestuffs derived from such o-xylidines are soluble to a greater extent in organic solvents than are the dyestuffs derived from technical xylidine, which ordinarily contains a relatively small proportion of o-xylidines.

For a fuller understanding of the nature and objects of the invention, reference should be had to the following detailed description and illustrative examples of the preparation and use of dyestuffs to which this invention relates. It will be understood, however, that the invention is not limited thereto except as limited by the appended patent claims. The parts are by weight.

*Example 1.*—Thirty-three (33) parts of N-phenyl-I-acid (2-phenylamino-5-naphthol-7-sulfonic acid) are dissolved in 400 parts of water containing 40 parts of sodium carbonate. To this solution, which is cooled to 0° C. by addition thereto of excess ice (about 200 parts), there is slowly added, with stirring, the solution obtained by diazotizing 12.1 parts of "return" ortho-xylidine in 200 parts of water by means of 28 parts of 20° Bé. hydrochloric acid and 7.2 parts of sodium nitrite of 96 per cent. purity. The temperature of the reaction mixture is maintained at about 0° C. during the mixing of the reagents and their reaction. When the reaction is complete the mixture is heated to about 85° C., then cooled to about 80° C. and the solid azo dye thus formed is filtered off from the liquid. By a coupling reaction between the phenyl-I-acid and the diazotized ortho-xylidine, the compound o-xylyl-azo-phenyl-I-acid is formed. The azo dye thus obtained is, in the dry state, a reddish powder which is soluble in ethanol, acetone, amyl acetate, methanol, ethylene glycol, diethylene glycol, the monobutyl ethers of ethylene glycol and of diethylene glycol, and other oxygen-containing organic solvents. It is practically insoluble in hydrocarbons of the benzene series.

A 4 per cent. solution of the dyestuff in alcohol stains wood a red color of good fastness to light. The wood thus stained may be subsequently coated with shellac and then varnished, waxed or coated with a suitable lacquer. The dyestuff is particularly suited for use in wood stains containing diethylene glycol, triethanolamine or a similar product preventing raising of the grain. The dyestuff solutions may be applied by brushing, dipping or spraying the wood.

The dyestuff is also of value for staining leather and for coloring lacquers, resins (particularly synthetic resins in the resol stage), and in general it may be used in the same manner and for the same purposes as other alcohol-soluble dyes heretofore known to the art. In view of its substantial insolubility in benzene, celluloid compositions colored with it can be cemented to white or other colored celluloid or related compositions without bleeding.

The "return" ortho-xylidine employed in the above example is a residual product obtained by treating a commercial or technical xylidine which contans a large proportion of meta- and/or para-xylidines and a small proportion of ortho-xylidines with glacial acetic acid to precipitate meta-xylidine as the acetate; filtering off the precipitate; then treating the resulting filtrate with hydrochloric acid to precipitate para-xylidine as the hydrochloride; and filtering off the resulting precipitate from the remaining solution of ortho-xylidine hydrochlorides (as described for example in Journal of the Chemical Society (London), vol. 77, p. 65 (1900)).

*Example 2.*—If in the process of Example 1 a xylidine is used which has been prepared by the nitration and reduction in the usual manner of a high-boiling xylene fraction of tar distillate (for example, an ortho-xylene distillate having a boiling point of 141° C. to 144° C.), a product is obtained which is soluble in alcohol giving a red solution and which may be used in the place of the dyestuff in Example 1 in its various technical applications. The product is, however, somewhat less soluble in alcohol than the dyestuff of Example 1.

The chief products obtained by the processes of Examples 1 and 2 may be represented in the free state by the formula:

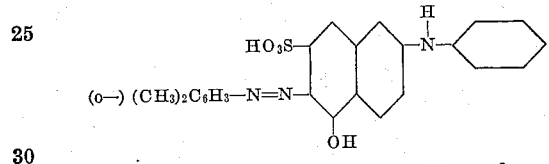

By replacing the N-phenyl-I-acid employed in the above examples by its equivalent of another N-aryl-I-acid or N-aralkyl-I-acid (as for example, N-benzyl-, N-tolyl-, N-xylyl-, N-anisidyl-, N-naphthyl-I-acid, etc.), other o-xylyl-azo-I-acid derivatives may be obtained. In the free state these compounds may be represented by the general formula:

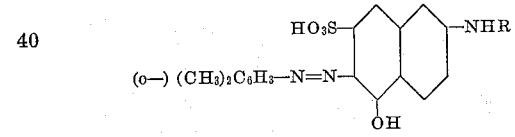

in which R represents an aryl or aralkyl radical which is free from an acid salt-forming group, and especially from a carboxyl and a sulfonic acid group.

Furthermore, the N-phenyl-I-acid of the above examples may be replaced by other N-aryl-, or N-aralkyl-, monoamino-monohydroxy-naphthalene-monosulfonic acids; as for example, N-phenyl-, N-tolyl-, N-xylyl-, N-anisidyl-, N-naphthyl-, N-benzyl-, and the like derivatives of Gamma-acid (2-amino-8-naphthol-6-sulfonic acid), of 1-amino-8-naphthol-4-sulfonic acid, etc. All of the said products in the free state may be represented by the general formula:

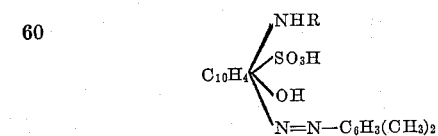

in which R represents an aryl or aralkyl radical which is free from an acid salt-forming group, and especially from a carboxyl and a sulfonic acid group.

Other dyes soluble in organic solvents, and useful in the coloring of material in accordance with the present invention, may be prepared in a similar manner from N-aryl-I-acids or other N-aryl-, or N-aralkyl-, monoamino-monohydroxy-naphthalene monosulfonic acids and other diazotized aromatic amines free from an acid salt-forming group in the aryl nucleus.

Thus, a dyestuff which is soluble in alcohol to yield a bluish red solution may be obtained by coupling diazotized alpha-naphthylamine with an alkaline solution of phenyl-I-acid. The dyestuff in the free state may be represented by the formula:

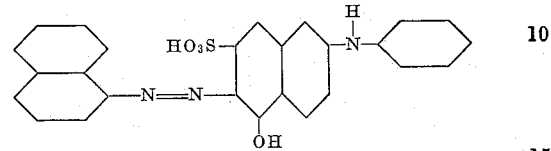

By coupling diazotized cresidine with phenyl-I-acid in alkaline solution, a dyestuff is obtained which is soluble in alcohol to yield a red solution. This dyestuff in the free state may be represented by the formula:

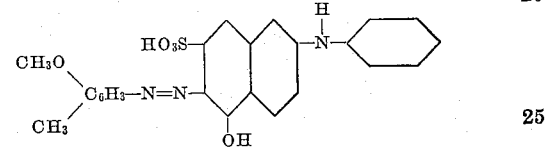

The dyestuff obtained by coupling diazobenzene with phenyl-I-acid in alkaline solution is soluble in alcohol to give an orange solution. The formula of the dyestuff in the free state may be represented as:

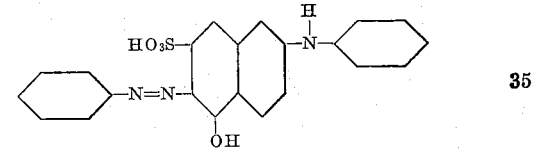

The dyestuff obtained by coupling diazotized amino-azoxylene with phenyl-I-acid in alkaline solution is soluble in alcohol to yield a violet solution. The dyestuff in the free state may be represented by the formula:

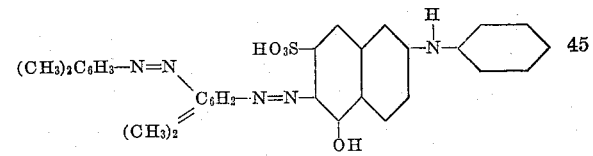

The new dyestuffs, produced as above described, in the free state may be represented by the formula:

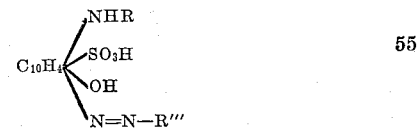

in which R and R''' represent radicals which are free from acid salt-forming groups, R represents further an aryl or aralkyl radical, and R''' represents a radical comprising the xylyl group.

In general, dyestuffs suitable for the coloring of materials in accordance with the present invention correspond in the free state with the general formula:

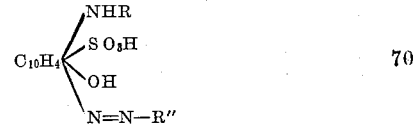

in which R and R'' represent radicals which are free from acid salt-forming groups, R represents further an aryl or aralkyl radical, and R'' represents further an aryl radical of the benzene or the naphthalene series. The aryl radicals represented by R'' in the above formula may contain elements or groups as substituents, provided these substituents are also free from an acid salt-forming group, and especially from carboxyl and sulfonic acid groups. Suitable substituents are, for example, alkyl, nitro, amino, alkylamino, arylamino, alkoxy, halogen, arylazo, and the like. These dyestuffs may be prepared, for example, by coupling an N-aryl, or an N-aralkyl, derivative of a monoamino-monohydroxy-naphthalene-monosulfonic acid, preferably in an alkaline medium, with a diazotized substituted or unsubstituted arylamine of the benzene or naphthalene series which is free from an acid salt-forming group; as for example, diazotized o-, m-, p-xylidine, and their mixtures; diazotized cumidine; diazotized o-, m-, p-nitraniline; diazotized o-, m-, p-aminophenols and their ethers; diazotized nitro-aminophenols, nitro-aminocresols, and their ethers; diazotized alpha- and beta-naphthylamines; diazotized aminonaphthols and their ethers; the various diazotized aminoazoxylenes and their mixtures; etc.

I claim:

1. A composition of matter comprising an azo coloring matter corresponding in the free state with the formula

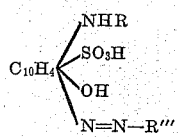

in which R represents a radical of the group consisting of aryl and aralkyl radicals, and R''' represents a radical comprising the xylyl-group, the radicals R and R''' being free from an acid salt-forming group, which azo coloring matter is obtainable by coupling a diazo xylene compound free from an acid salt-forming group, in an alkaline medium, with an amino naphthol sulfonic acid corresponding in the free state with the formula

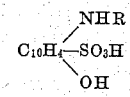

in which R represents a radical of the group consisting of aryl and aralkyl radicals, said radical being free from an acid salt-forming group.

2. A composition of matter comprising an azo coloring matter corresponding in the free state with the formula

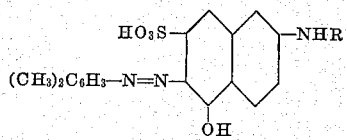

in which R represents a radical of the group consisting of the aryl and aralkyl radicals, said radical being free from an acid salt-forming group, said coloring matter being soluble in alcohol.

3. A composition of matter comprising an o-xylyl-azo compound corresponding in the free state with the formula

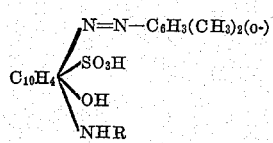

in which R represents a radical of the group consisting of aryl and aralkyl radicals, said radical being free from an acid salt-forming group, said compound being soluble in alcohol and being obtainable by coupling diazotized ortho-xylidine in an alkaline medium with an amino naphthol sulfonic acid corresponding in the free state with the formula

in which R represents a radical of the group consisting of aryl and aralkyl radicals, said radical being free from an acid salt-forming group.

4. A composition of matter comprising o-xylyl-azo-N-phenyl-I-acid corresponding in the free state with the formula

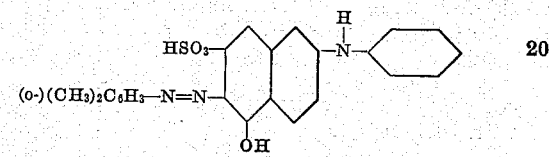

said compound being soluble in alcohol to give a red solution.

5. A composition of matter comprising an azo coloring matter corresponding in the free state with the formula

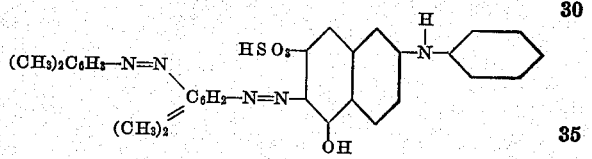

said coloring matter being soluble in alcohol to give a violet solution.

6. The process for the production of a dyestuff soluble in organic solvents which comprises diazotizing ortho-xylidine, mixing the diazotized product with a solution of phenyl-I-acid in an aqueous solution of sodium carbonate, whereby coupling of said compounds is induced, maintaining the temperature at about 0° C. during the coupling, then heating the reaction mixture, and recovering therefrom the solid dyestuff thus formed.

7. A composition of matter comprising an azo coloring matter corresponding in the free state with the formula

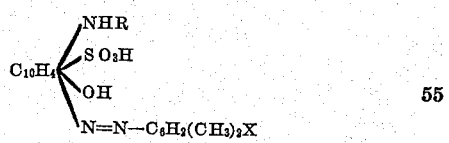

in which R represents a radical of the group consisting of aryl and aralkyl radicals, said radical being free from an acid salt-forming group, and X represents a member of the group consisting of hydrogen and the radical

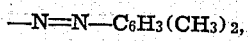

said coloring matter being soluble in alcohol and obtainable by diazotizing the corresponding xylidine compound and coupling the diazotized product in an alkaline medium with an amino naphthol sulfonic acid corresponding in the free state with the formula

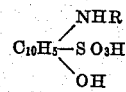

in which R represents a radical of the group consisting of the aryl and aralkyl radicals, said radical being free from an acid salt-forming group.

8. A composition of matter comprising an azo coloring matter corresponding in the free state with the formula

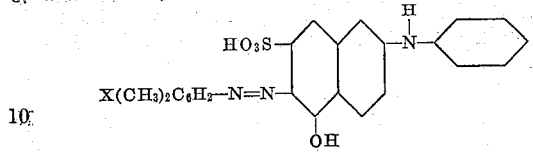

in which X represents a member of the group consisting of hydrogen and the radical

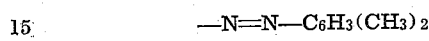

said coloring matter being soluble in alcohol and obtainable by diazotizing the corresponding o-xylidine compound and coupling with 2-phenyl-amino-5-naphthol-7-sulfonic acid in an alkaline medium.

9. A composition of matter comprising an azo coloring matter corresponding in the free state with the formula

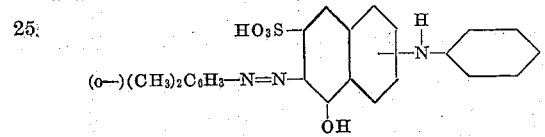

said coloring matter being soluble in alcohol and obtainable by diazotizing the corresponding o-xylidine and coupling in an alkaline medium with an amino naphthol sulfonic acid corresponding in the free state with the formula

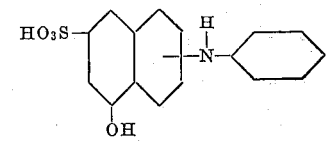

10. A composition of matter comprising an azo coloring matter corresponding in the free state with the formula

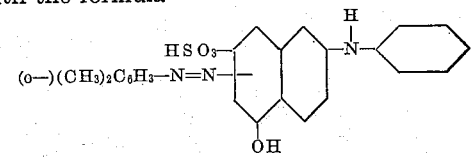

and obtainable by diazotizing ortho-xylidine and coupling the diazotized product in an alkaline medium with 2-phenylamino-5-naphthol-7-sulfonic acid, the sodium salt of said coloring matter being soluble in ethyl alcohol, methyl alcohol, and other oxygen-containing organic solvents, and substantially insoluble in benzene.

JAMES P. PENNY.